United States Patent
Zollner et al.

(10) Patent No.: US 9,316,149 B2
(45) Date of Patent: Apr. 19, 2016

(54) METHOD AND CONTROL UNIT FOR OPERATING A DRIVE TRAIN OF A HYBRID VEHICLE

(75) Inventors: Tobias Zollner, Lindau (DE); Bernd Allgaier, Kressbronn (DE); Clemens Kuhn, Eriskirch (DE); Patrick Peter, Kressbronn (DE); Lorenz Fehrenbach, Friedrichshafen (DE); Holger Bacher, Lindau (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 27 days.

(21) Appl. No.: 13/978,154

(22) PCT Filed: Dec. 6, 2011

(86) PCT No.: PCT/EP2011/071824
§ 371 (c)(1),
(2), (4) Date: Jul. 3, 2013

(87) PCT Pub. No.: WO2012/097910
PCT Pub. Date: Jul. 26, 2012

(65) Prior Publication Data
US 2013/0284125 A1    Oct. 31, 2013

(30) Foreign Application Priority Data
Jan. 17, 2011    (DE) .......................... 10 2011 002 742

(51) Int. Cl.
*F02B 63/00*    (2006.01)
*F02B 63/04*    (2006.01)
(Continued)

(52) U.S. Cl.
CPC . *F02B 63/04* (2013.01); *B60K 6/48* (2013.01); *B60W 20/00* (2013.01); *B60W 30/192* (2013.01);
(Continued)

(58) Field of Classification Search
CPC .. F02B 63/04; F02B 2063/045; F02B 63/044; F02B 77/13; F02B 75/16
USPC ............................................................ 123/2
See application file for complete search history.

(56) References Cited

U.S. PATENT DOCUMENTS 6,077,186 A    6/2000    Kojima et al.
7,670,257 B2    3/2010    Popp et al.
(Continued)

FOREIGN PATENT DOCUMENTS

DE    102 60 435 A1    7/2004
DE    698 31 468 T2    6/2006
(Continued)

OTHER PUBLICATIONS

German Search Report Corresponding to 10 2011 002 742.4 mailed Mar. 13, 2014.
(Continued)

*Primary Examiner* — Lindsay Low
*Assistant Examiner* — Charles Brauch
(74) *Attorney, Agent, or Firm* — Davis & Bujold, P.L.L.C.; Michael J. Bujold

(57) ABSTRACT

A method of operating a drive-train of a hybrid vehicle which comprises at least a hybrid drive with an internal combustion engine and an electric machine, an automatic or automated change-speed transmission connected between the hybrid drive and a drive output, and a clutch connected between the internal combustion engine and the electric machine. When starting the internal combustion engine from a purely electric driving mode, the clutch is initially disengaged. To start the internal combustion engine, the clutch is at least partially engaged and the internal combustion engine is drag-started by the electric machine, and, in parallel with starting the internal combustion engine, a downshift in the transmission is initiated once a rotational speed of the internal combustion engine reaches or exceeds an applicable threshold value.

13 Claims, 2 Drawing Sheets

(51) Int. Cl.
  *B60K 6/48* (2007.10)
  *B60W 20/00* (2006.01)
  *B60W 30/192* (2012.01)
  *F02B 77/13* (2006.01)
  *F02B 75/16* (2006.01)
  *B60W 10/02* (2006.01)
  *B60W 10/06* (2006.01)
  *B60W 10/11* (2012.01)
  *F16H 61/16* (2006.01)

(52) U.S. Cl.
  CPC ........ *B60K 2006/4825* (2013.01); *B60W 10/02* (2013.01); *B60W 10/06* (2013.01); *B60W 10/11* (2013.01); *B60W 2510/0638* (2013.01); *B60Y 2300/49* (2013.01); *F02B 63/044* (2013.01); *F02B 75/16* (2013.01); *F02B 77/13* (2013.01); *F02B 2063/045* (2013.01); *F16H 2061/163* (2013.01); *Y02T 10/6221* (2013.01); *Y02T 10/6252* (2013.01)

(56) References Cited

U.S. PATENT DOCUMENTS 8,388,494 B2    3/2013   Schiele et al.

2008/0125927 A1    5/2008   Gohring et al.
2008/0257084 A1*  10/2008   Coxon .......................... 74/335
2009/0075779 A1*   3/2009   Kumazaki et al. ................ 477/3
2010/0000812 A1*   1/2010   Deuble et al. ............ 180/65.265
2011/0186369 A1    8/2011   Richter

FOREIGN PATENT DOCUMENTS

DE    10 2006 031 684 A1    1/2008
DE    10 2006 034 934 A1    1/2008
DE    10 2008 040 692 A1    1/2010
DE    10 2010 043 355 A1    5/2012
EP         1 762 417 A1    3/2007
FR         2 923 792 A1    5/2009

OTHER PUBLICATIONS

International Search Report Corresponding to PCT/EP2011/071824 mailed Jul. 25, 2012.

Written Opinion Corresponding to PCT/EP2011/071824 mailed Jul. 25, 2012.

* cited by examiner

METHOD AND CONTROL UNIT FOR OPERATING A DRIVE TRAIN OF A HYBRID VEHICLE

This application is a National Stage completion of PCT/EP2011/071824 filed Dec. 6, 2011, which claims priority from German patent application serial no. 10 2011 002 742.4 filed Jan. 17, 2011.

FIELD OF THE INVENTION

The invention concerns a method for operating a drive-train of a hybrid vehicle. Furthermore, the invention concerns a control unit for operating a drive-train of a hybrid vehicle.

BACKGROUND OF THE INVENTION

DE 102 60 435 A1 describes a method for operating a drive-train of a hybrid vehicle, the drive-train disclosed therein comprises an internal combustion engine and an electric machine, with a clutch connected between the internal combustion engine and the electric machine. In addition the drive-train described therein comprises a transmission connected between the drive aggregate and a drive output of the drive-train. From this prior art it is known, when the motor vehicle is being operated purely under electric-motor power by the electric machine of the hybrid drive, that to start the internal combustion engine the clutch connected between the internal combustion engine and the electric machine is closed in order to drag-start the internal combustion engine of the hybrid drive by means of the electric machine of the hybrid drive.

DE 10 2006 034 934 A1 describes a further method for operating a drive-train of a hybrid vehicle, in which to start the internal combustion engine, again a clutch connected between the internal combustion engine and an electric machine is closed; in this case the closing of the clutch and thus the transmission from the electric machine to the internal combustion engine of the torque that serves to start the internal combustion engine is coupled in time with a downshift process in the transmission.

SUMMARY OF THE INVENTION

Starting from there the purpose of the present invention is to provide a new type of method and control unit for operating a drive-train of a hybrid vehicle.

According to the invention, a downshift in the transmission in parallel with the starting of the internal combustion engine is initiated when the rotational speed of the internal combustion engine reaches or exceeds an applicable threshold value.

With the present invention it is proposed for the first time, when an internal combustion engine is drag-started by means of the electric machine, to begin carrying out a downshift in the transmission in parallel when the rotational speed of the internal combustion engine reaches or exceeds an applicable threshold value. In this way the time sequence of starting the internal combustion engine and carrying out the downshift in the transmission can be made shorter and the spontaneity of the drive-train thereby increased. Coupling the beginning of the downshift to be carried out in the transmission with the reaching or exceeding of the applicable threshold value of the rotational speed of the internal combustion engine, enables optimum coordination between the downshift to be carried out and the starting of the internal combustion engine.

In an advantageous further development of the invention, to start the internal combustion engine the clutch is first at least partially closed so that the clutch transmits a torque of the electric machine for drag-starting the internal combustion engine, and then, when the rotational speed of the internal combustion engine has reached or exceeded a defined threshold, the clutch is opened at least far enough so that it no longer transmits any torque, thereby enabling the internal combustion engine to run up freely, and subsequently, when the speed of the internal combustion engine reaches or exceeds that of the electric machine, the clutch is closed and the internal combustion engine is coupled to the drive-train, and when during this the speed of the internal combustion engine reaches or exceeds the applicable threshold value, a downshift in the transmission is initiated in parallel with the starting of the internal combustion engine.

The above sequence of the method according to the invention on the one hand makes it possible for the internal combustion engine to speed up without interference, and on the other hand the downshift to be carried out and the starting of the internal combustion engine are optimally coordinated with one another.

Preferably, when, to start the internal combustion engine, the clutch is first at least partially closed, a shift block is transmitted to a shift sequence control unit and a shift demand is transmitted to a shifting strategy, such that the shifting strategy checks whether during hybrid driving a downshift in the transmission is required, and the shift block is lifted when the rotational speed of the internal combustion engine reaches or exceeds the applicable threshold value.

The simultaneous transmission of the shift block to the shift sequence, on the one hand, and of the shift demand to the shifting strategy, on the other hand, when the clutch is at least partially closed in order to drag-start the internal combustion engine, is particularly advantageous from the control standpoint. Thus, in the shift sequence control unit the initiation of a downshift is at first blocked, but in the shifting strategy it can already be checked in parallel whether, during hybrid driving, a downshift is required. When the speed of the internal combustion engine has reached or exceeded the applicable threshold value, the shift block is lifted so that then, in parallel with the starting of the internal combustion engine, the downshift can be initiated and can be carried out. This allows particularly advantageous implementation of the method according to the invention in a control unit.

According to an advantageous further development of the invention, the applicable threshold value of the rotational speed of the internal combustion engine, which when it is reached or exceeded leads to the initiation of a downshift in the transmission in parallel with the starting of the internal combustion engine, is determined as a function of a current gear of the downshift to be carried out, and/or as a function of a target gear of the downshift to be carried out, and/or as a function of a transmission temperature of the transmission. The determination of the applicable threshold value of the internal combustion engine speed as a function of the current gear and/or as a function of the target gear and/or as a function of a transmission temperature allows optimum coordination of the method in relation to various operating conditions of the drive-train.

The control unit for operating a drive-train of a hybrid vehicle is also discussed herein.

BRIEF DESCRIPTION OF THE DRAWINGS

Example embodiments of the invention, to which it is not limited, are explained in more detail with reference to the drawing, which shows.

DETAILED DESCRIPTION OF THE PREFERRED EMBODIMENTS

Figure 1:
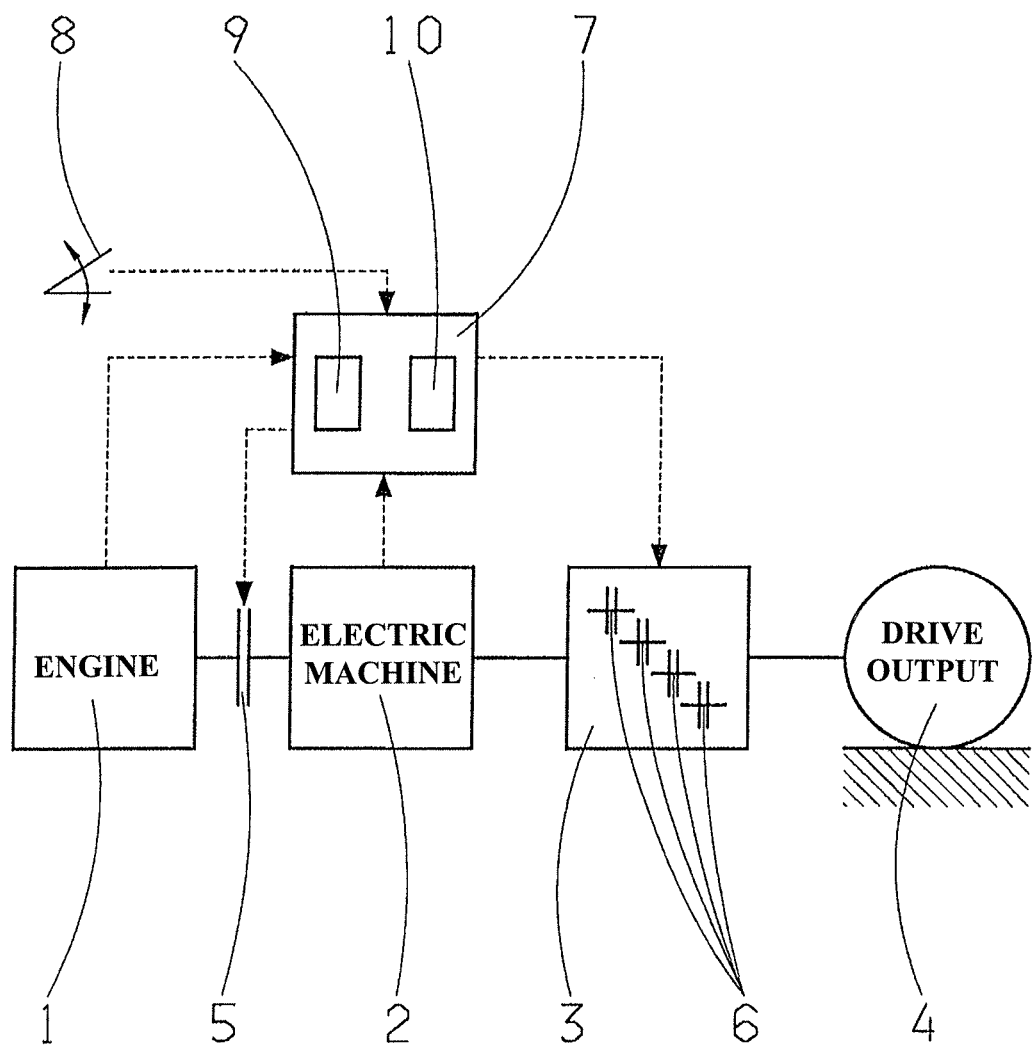
FIG. 1: A schematic representation of a drive-train with which the method according to the invention can be used.

FIG. 1 shows an example embodiment of a drive-train of a hybrid vehicle, the hybrid drive of the drive-train being formed of an internal combustion engine 1 and an electric machine 2. The internal combustion engine 1 and the electric machine 2 of the hybrid drive can produce a drive torque, which is converted by a transmission 3 and delivered to a drive output 4.

The transmission 3 is an automatic or automated change-speed transmission. Thus, FIG. 1 shows that the transmission comprises shifting elements 6, for example shifting elements 6 in the form of clutches or brakes, such that to carry out a shift in the transmission 3 at least one shifting element 6 has to be engaged or closed and at least one other shifting element 6 has to be disengaged or opened.

Between the internal combustion engine 1 and the electric machine 2 of the hybrid drive is connected a clutch 5, such that when the clutch 5 is open the internal combustion engine 1 is decoupled from the drive-train and when the clutch 5 is closed the internal combustion engine 1 is coupled to the drive-train.

Although this is not shown in FIG. 1, a transmission-external starting element can additionally be connected between the electric machine 2 and the transmission 3. In FIG. 1 the transmission 3 has a transmission-internal starting element, this preferably being one of the shifting elements 6.

FIG. 1 also shows that the drive-train comprises a control unit 7, which as indicated by the broken-line arrows is coupled to the internal combustion engine 1, the electric machine 2, the transmission 3 and the clutch 5 and which exchanges data with those assemblies. Furthermore, the control unit 7 exchanges data in particular also with a drive pedal 8.

The control unit 7 comprises a shift sequence control element 9 and a shifting strategy 10, such that the shift sequence control element 9 controls or regulates the carrying out of a gearshift or shift operation in the transmission 3 and the shifting strategy 10 checks whether the carrying out of a shifting operation in the transmission 3 is necessary. This checking in the shifting strategy 10 takes place in particular as a function of the actuation of the drive pedal 8 by a driver.

The invention now concerns a method by which the internal combustion engine 1 can be started, namely from an initial condition of the drive-train in which the drive-train, with the internal combustion engine 1 turned off and decoupled from the drive-train by the open clutch 5, is to be started from a purely electric drive mode, and this indeed while shortening the time sequence of the internal combustion engine's start, if needs be along with a downshift to be carried out in the transmission 3, so as in this way to increase the spontaneity of the drive-train.

In the context of the invention, to start the internal combustion engine 1 from a purely electric drive mode of the drive-train and with the clutch 5 initially open, the clutch 5 is first at least partially closed and the internal combustion engine 1 is drag-started by the electric machine 2, namely since to drag-start the internal combustion engine 1 the clutch 5 transmits torque delivered by the electric machine 2. During this, if the shifting strategy 10 detects that a downshift should be carried out in the transmission 3, for example due to actuation of the drive pedal 8, then in parallel with starting the internal combustion engine 1 the downshift is initiated in the transmission 3 when a rotational speed of the internal combustion engine 1 reaches or exceeds an applicable threshold value. The implementation of the method is in this case controlled or regulated by the control unit 7.

Further details and advantageous further developments of the invention are described below with reference to FIG. 2, that figure showing a time diagram in which a number of parameter curves are plotted as a function of time t, namely a time variation 11 of a rotational speed n of the internal combustion engine 1, a time variation 12 of a rotational speed n of the electric machine 2, a time variation 13 of the control of the clutch 5, namely of the torque M transmitted by the clutch by virtue of its actuation, a time variation 14 of the emission of a shift block to the shift sequence control unit 9, a time variation 15 of the emission of a shift demand to the shifting strategy 10, a time torque variation 16 of a shifting element 6 of the transmission 3 that has to be engaged or closed in order to carry out the downshift, a time torque variation 17 of another shifting element 6 of the transmission 3 that has to be disengaged or opened in order to carry our the downshift, and a time variation 18 of an operating condition of the drive-train.

Figure 2:
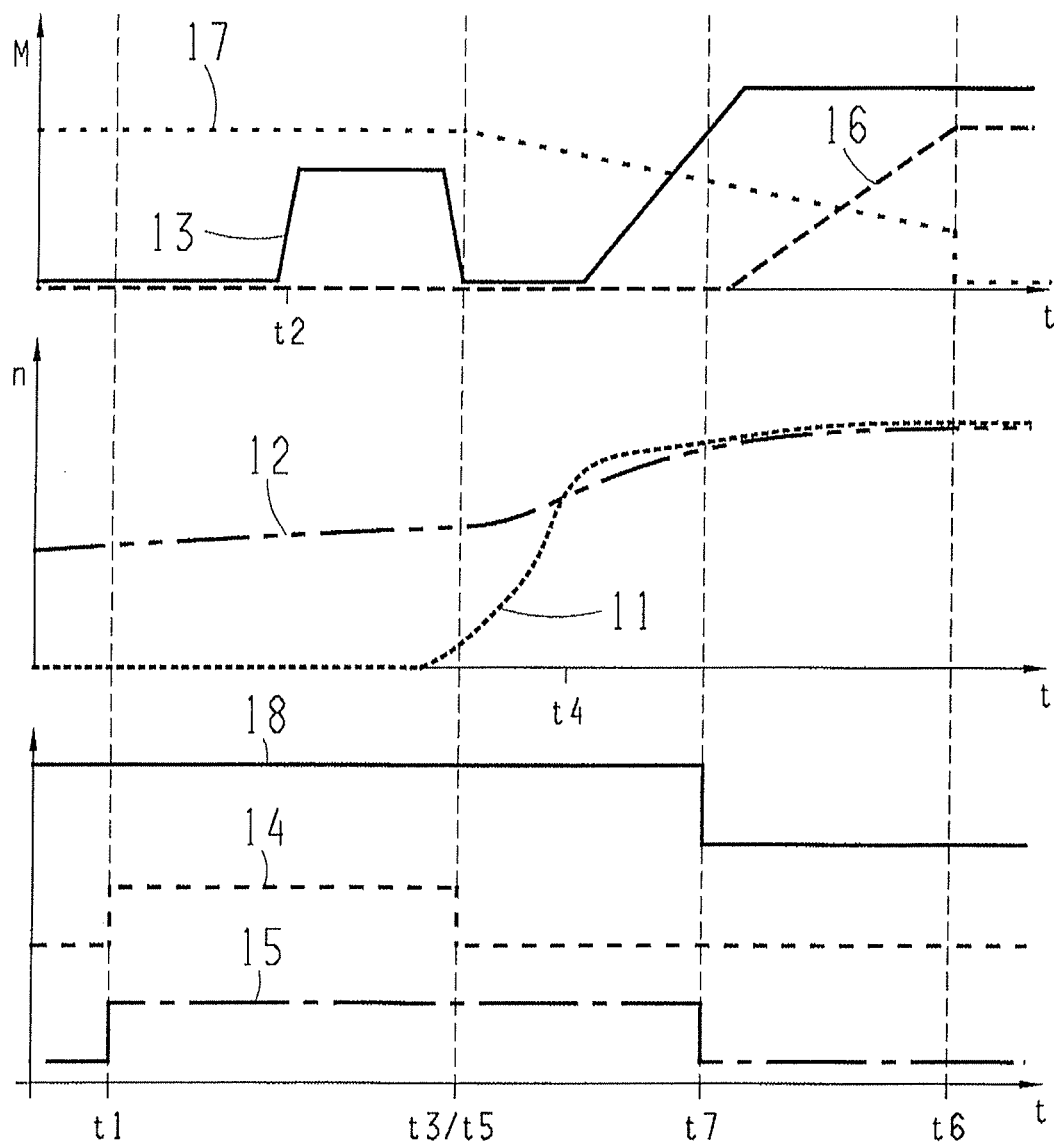
FIG. 2: A diagram to clarify the method according to the invention.

From FIG. 2 it is clear that in the initial condition of the method, before time point t1, the electric machine 2 is running and the drive-train is operating under purely electric power, the internal combustion engine 1 is off and, since the clutch 5 is open so that it cannot transmit any torque, the internal combustion engine is decoupled from the drive-train.

If now, for example due to actuation of the drive pedal 8, the internal combustion engine 1 is started, because for example it has been detected as a result of the drive pedal actuation that the torque desired by the driver cannot be supplied to the drive output 4 by the electric machine 2, then the internal combustion engine 1 is drag-started by means of the electric machine 2 and to do that, beginning at time t1, the clutch 5 is first partially closed far enough for the clutch 5 to be able to transmit torque from the electric machine 2 that is sufficient to drag-start the internal combustion engine 1. This is the case at time t2.

When, after this, the rotational speed of the internal combustion engine 1 reaches or exceeds a defined threshold value and the internal combustion engine 1 can therefore run up by itself, the clutch 5 is opened at least far enough so that it no longer transmits any torque and the internal combustion engine 1 can run up freely, which happens at time t3 in FIG. 2.

Thereafter, when the speed of the internal combustion engine 1 reaches or exceeds the speed of the electric machine 2, the clutch 5 is closed and the internal combustion engine 5 is coupled to the drive-train, this taking place at time t4 in FIG. 2.

Now, in order to shorten a time sequence of starting the internal combustion engine 1 and carrying out a downshift in the transmission 3 and thus to increase the spontaneity, in parallel with the starting of the internal combustion engine 1 a downshift in the transmission 3 is initiated when a rotational speed of the internal combustion engine 1 reaches or exceeds an applicable threshold value, this taking place in FIG. 2 at time t5, which coincides with time t3 in FIG. 2.

However, the time point t5 can also occur after time t3. In any case time t5 occurs before time t4. When the times t5 and t3 coincide, this ensures particularly great spontaneity.

The applicable threshold value for the rotational speed of the internal combustion engine 1, on reaching or exceeding which the downshift in the transmission 3 is initiated in parallel with the starting of the internal combustion engine 2, is accordingly higher than or equal to the defined threshold on reaching or exceeding which the clutch 5 is opened again to allow free running up of the internal combustion engine 1, but lower than the rotational speed of the electric machine 2.

This applicable threshold value of the rotational speed of the internal combustion engine 1, on reaching or exceeding which a downshift in the transmission 3 is initiated in parallel with the starting of the internal combustion engine 2, is preferably determined as a function of the current gear, the target gear of the downshift to be carried out and as a function of an operating temperature of the transmission 3, in order to achieve optimum coordination with one another, of the drag-starting of the internal combustion engine 1 and the carrying out of the downshift in the transmission 3 as a function of the current operation situation of the drive-train.

FIG. 2 also shows that when, to start the internal combustion engine 1, beginning at time t1, the clutch 5 is first at least partially closed, a shift block 14 is transmitted to the shift sequence control unit 9 and at the same time a shift demand 15 is transmitted to the shifting strategy 10.

The shift suppression or shift block issued in the sense of the time signal variation 14 prevents a shifting operation from being carried out in the transmission 3, while the shift demand issued in the sense of the signal variation 15 enables the shifting strategy 10 in parallel to check whether, during the forthcoming hybrid driving, a downshift in the transmission 3 is required.

If the shifting strategy 10 detects that a downshift in the transmission 3 is necessary, then when at time t5 the speed of the internal combustion engine 1 reaches or exceeds the applicable threshold value, the shift block 14 is lifted so that the carrying out of a shifting operation or gearshift in the transmission 3 can begin. To carry out a gearshift or shifting operation in the transmission 3 at least one shifting element 6 is opened or disengaged (see torque variation 17) and at least one other shifting element 6 is closed or engaged (see torque variation 16).

The shifting operation begins at time t5 and ends at time t6. The drag-starting of the internal combustion engine 1 begins at time t1 and ends at time t7, i.e. before the end of the shifting operation.

Until time t7 (see variation 18) the drive-train is operating in the purely electric driving mode, whereas after time t7 the drive-train is operating in the hybrid driving mode.

The actual shifting operation begins when, at time t4, the internal combustion engine 1 is coupled to the drive-train by closing the clutch 5. During the actual shift the clutch 5 can be operated with overpressure or in a slipping mode.

The method according to the invention is implemented by the control unit 9, or the implementation of the method is controlled or regulated by the control unit 9, the control unit 9 comprising the shift sequence control element 9 and the shifting strategy 10. The control unit 9 receives data from the internal combustion engine 1, from the electric machine 2 and from the drive pedal 8. The control unit 9 sends control commands to the clutch 5 for staring the internal combustion engine 1 and to the transmission 3 for carrying out a downshift by way of the shifting elements 6 of the transmission 3. The shift sequence control 9 and the shifting strategy 10 are means of the control unit 9 which it contains in order to implement the method.

INDEXES

1 Internal combustion engine
2 Electric machine
3 Automatic or automated change-speed transmission
4 Drive output
5 Clutch
6 Shifting element
7 Control unit
8 Drive pedal
9 Shift sequence control unit
10 Shifting strategy
11 Time variation of the rotational speed of the internal combustion engine 1
12 Time variation of the rotational speed of the electric machine 2
13 Time variation of the torque transmitted by the clutch 5
14 Time variation of a shift suppression
15 Time variation of a shift demand
16 Time variation of the torque transmitted by a shifting element to be engaged
17 Time variation of the torque transmitted by a shifting element to be disengaged
18 Operating condition of the drive-train

The invention claimed is:

1. A method of operating a drive-train of a hybrid vehicle, the drive-train comprising at least a hybrid drive comprising an internal combustion engine (1) and an electric machine (2), either an automatic or an automated change-speed transmission (3) being connected between the hybrid drive and a drive output (4), and a clutch (5) being connected between the internal combustion engine (1) and the electric machine (2), and the clutch (5), when starting the internal combustion engine (1) from a purely electric driving mode, being initially disengaged, the method comprising the steps of:
   at least partially engaging the clutch (5) such that the clutch (5) transmits torque from the electric machine (2) to the internal combustion engine (1) in order to start the internal combustion engine (1),
   drag-starting the internal combustion engine (1) via the electric machine (2),
   in parallel with the starting of the internal combustion engine (1), once a rotational speed of the internal combustion engine either reaches or exceeds a threshold value, prior to completion of the starting of the internal combustion engine, initiating a downshift in the transmission (3), and
   when the rotational speed of the internal combustion engine (1) either reaches or exceeds a defined threshold, sufficiently disengaging the clutch (5) at least so that the clutch no longer transmits any torque and the internal combustion engine (1) can run freely, and
   engaging the clutch (5) and coupling the internal combustion engine (1) to the drive-train once a rotational speed of the internal combustion engine (1) either reaches or exceeds a rotational speed of the electric machine (2).

2. The method according to claim 1, further comprising the step of transmitting a shift block to a shift sequence control unit (9), when the clutch (5) is first at least partially engaged, which temporarily prevents the downshift in the transmission (3) from occurring.

3. The method according to claim 2, further comprising the step of lifting the shift block once the rotational speed of the internal combustion engine (1) either reaches or exceeds the threshold value.

4. The method according to claim 1, further comprising the step of, when the clutch (5) is first at least partially engaged, transmitting a shift demand to a shifting strategy (10), and
   checking, via the shifting strategy (10), whether a downshift in the transmission (3) is necessary during hybrid driving.

5. The method according to claim 1, further comprising the step of determining the threshold value for the speed of the internal combustion engine (1) which, when it is either reached or exceeded, results in the initiation of the downshift in the transmission (3) in parallel with the starting of the internal combustion engine (1), the threshold value is as at least one of:
a function of a current gear of the downshift to be carried out,
a function of a target gear of the downshift to be carried out, and
a function of a transmission temperature of the transmission (3).

6. A control unit for operating a drive-train of a hybrid vehicle which, in order to start an internal combustion engine (1) of a hybrid drive from a purely electric driving mode, actuates an initially disengaged clutch (5), connected between the internal combustion engine (1) and an electric machine (2) of the hybrid drive, such that the clutch (5) is first at least partially engaged so as to drag-start the internal combustion engine (1) with the electric machine (2) of the hybrid drive,
the control unit controlling a transmission (3) such that a downshift is initiated in the transmission (3), in parallel with the starting of the internal combustion engine (1) and prior to completion of the starting of the internal combustion engine, when a rotational speed of the internal combustion engine (1) either reaches or exceeds an applicable threshold value, and the clutch is disengaged when the rotational speed of the internal combustion engine either reaches or exceeds a defined threshold, and
subsequently engaging the clutch to couple the internal combustion engine to the drive train once the rotational speed of the internal combustion engine either reaches or exceeds a rotational speed of the electric machine.

7. The control unit according to claim 6, wherein the control unit comprises control commands for implementing a method of operating the drive-train of the hybrid vehicle, the drive-train comprises, either an automatic or an automated change-speed transmission (3) that is connected between the hybrid drive and a drive output (4) and the clutch (5) that is connected between the internal combustion engine (1) and the electric machine (2), for starting the internal combustion engine (1) from the purely electric driving mode with the clutch (5) initially being disengaged, to start the internal combustion engine (1), the clutch (5) is at least partially engaged and the internal combustion engine (1) is drag-started by the electric machine (2), in parallel with the starting of the internal combustion engine (1), the downshift in the transmission (3) is initiated when the rotational speed of the internal combustion engine either reaches or exceeds the applicable threshold value and prior to completion of the starting of the internal combustion engine.

8. A method of operating a drive-train of a hybrid vehicle, the drive-train comprising an internal combustion engine, an electric machine, either an automatic or an automated change-speed transmission being connected in a flow of drive between the electric machine and a drive output, and a clutch being connected between the internal combustion engine and the electric machine, the method comprising the steps of:
driving the hybrid vehicle in a purely electric driving mode with the internal combustion engine turned off and the clutch disengaged;
at least partially engaging the clutch to transmit torque from the electric machine, via the clutch, to the internal combustion engine in order to drag-start the internal combustion engine with the electric machine,
in parallel with the drag starting of the internal combustion engine, before completing the drag starting of the internal combustion engine, initiating a downshift in the transmission once a rotational speed of the internal combustion engine either reaches or exceeds a threshold value; and
when the rotational speed of the internal combustion engine either reaches or exceeds a defined threshold, at least partially disengaging the clutch to a point such that no torque is transferred by the clutch from the electric machine to the internal combustion engine such that the internal combustion engine is free to run-up without transmitting torque; and
subsequently re-engaging the clutch, once the rotational speed of the internal combustion engine either reaches or exceeds a rotational speed of the electric machine, to couple the internal combustion engine to the drive-train.

9. The method according to claim 8, further comprising the steps of:
beginning the drag starting of the internal combustion engine by the at least partial engaging of the clutch, and
ending the drag starting of the internal combustion engine when the clutch is re-engaged and closed and a rotational speed of internal combustion engine is substantially equal to a rotational speed of the electric machine.

10. The method according to claim 8, further comprising the steps of:
initiating the downshift concurrent with or after the re-disengaging of the clutch but before a rotational speed of internal combustion engine reaches or exceeds a rotational speed of the electric machine.

11. The method according to claim 8, further comprising the steps of:
transmitting a shift block to a shift sequence control unit, upon initiation of the drag starting of the internal combustion engine, to prevent temporarily a downshift in the transmission from occurring;
transmitting a shift demand to a shifting strategy upon initiation of the drag starting of the internal combustion engine, and the shift demand causing the shift strategy to check whether a downshift in the transmission is required; and
upon re-disengaging the clutch, removing the shift block.

12. The method according to claim 8, further comprising the steps of:
beginning the drag starting of the internal combustion engine by the at least partial engagement of the clutch,
transmitting a shift block to a shift sequence control unit, upon initiation of the drag starting of the internal combustion engine, to temporarily prevent a downshift in the transmission from occurring;
transmitting a shift demand to a shifting strategy upon initiation of the drag starting of the internal combustion engine, with the shift demand causing the shift strategy to check whether a downshift in the transmission is required;
sufficiently disengaging the clutch, once the internal combustion engine commences operation, so that the clutch no longer transmits any torque and the rotational speed of the internal combustion engine can run freely and reach or exceed a defined threshold value;
removing the shift block when the clutch is disengaged;
initiating a downshift concurrent with or after disengaging the clutch but before a rotational speed of internal combustion engine reaches or exceeds a rotational speed of the electric machine; and reengaging the clutch when the rotational speed of the internal combustion engine reaches or exceeds the rotational speed of the electric machine.

13. The method according to claim 8, further comprising the steps of:
   beginning the drag starting of the internal combustion engine by the at least partial engaging of the clutch,
   transmitting a shift block to a shift sequence control unit, upon initiation of the drag starting of the internal combustion engine, to temporarily prevent a downshift in the transmission from occurring;
   transmitting a shift demand to a shifting strategy upon initiation of the drag starting of the internal combustion engine, with the shift demand causing the shift strategy to check whether a downshift in the transmission is required;
   sufficiently disengaging the clutch, once the internal combustion engine commences operation, so that the clutch no longer transmits any torque and the rotational speed of the internal combustion engine can run freely and reach or exceed a defined threshold value;
   removing the shift block when the clutch is disengaged;
   initiating a downshift concurrent with or after disengaging the clutch but before a rotational speed of internal combustion engine reaches or exceeds a rotational speed of the electric machine;
   starting to disengage a shift element when the downshift is initiated;
   completing the downshift after ending the drag starting of the internal combustion engine; and
   reengaging the clutch when the rotational speed of the internal combustion engine reaches or exceeds a rotational speed of the electric machine.

* * * * *